United States Patent [19]
Reil et al.

[11] Patent Number: 5,096,402
[45] Date of Patent: Mar. 17, 1992

[54] PACKAGE PRODUCING MACHINE WITH GUIDED TRANSPORT CONTAINERS

[75] Inventors: Wilhelm Reil, Bensheim; Ulrich Deutschbein, Mühltal, both of Fed. Rep. of Germany

[73] Assignee: Tetra Pak Holdings & Finance S. A., Pully, Switzerland

[21] Appl. No.: 604,663

[22] Filed: Oct. 26, 1990

[30] Foreign Application Priority Data

Oct. 28, 1989 [DE] Fed. Rep. of Germany ....... 3935975

[51] Int. Cl.$^5$ ..................... B29C 39/06; B29C 45/04; B29C 45/33
[52] U.S. Cl. ................. 425/116; 425/126.1; 425/127; 425/129.1; 425/542
[58] Field of Search ..................... 425/116, 117, 126.1, 425/542, 127, 129.1

[56] References Cited

U.S. PATENT DOCUMENTS

| | | | |
|---|---|---|---|
| 2,632,918 | 3/1953 | Bergstein | 425/126.1 |
| 2,840,854 | 7/1958 | Sherman | 425/126.1 |
| 2,953,815 | 9/1960 | Mainradi | 425/126.1 |
| 2,994,107 | 8/1961 | Quinche | 425/126.1 |
| 3,027,989 | 4/1962 | Phillips et al. | 198/20 |
| 3,507,095 | 4/1970 | Kuhnle | 53/183 |
| 3,619,979 | 11/1971 | Martensson et al. | 53/186 |
| 4,351,629 | 9/1982 | Farrell | 425/116 |

FOREIGN PATENT DOCUMENTS 1786390 1/1972 Fed. Rep. of Germany .
3531728 3/1986 Fed. Rep. of Germany .

*Primary Examiner*—Willard Hoag
*Attorney, Agent, or Firm*—Howard M. Ellis; Michael L. Dunn

[57] ABSTRACT

The invention describes a machine for producing packages for milk and comprising a tube of coated paper with means of forming the tube and means of integrally moulding synthetic plastics material onto the tube and with, extending along the machining path, a conveyor belt supporting a row of cross-sectionally quadrangular transport containers, with means of introducing the tube into the relevant transport container and with means of removing the finished tube and carrying it away.

To increase the output from the package producing machine so that in particular the injection moulding tools can be more rapidly opened and closed, it is according to the invention proposed that a first part of at least one strand of the endless revolving conveyor belt extend at a fixed angle ($\alpha$) of preferably about 45° to the second part of this strand and in that a side wall of a transport container be disposed parallel with the main plane of the flat conveyor belt and in that rails for guiding the conveyor belt be fixed lengthwise of its conveyance path.

11 Claims, 8 Drawing Sheets

PACKAGE PRODUCING MACHINE WITH GUIDED TRANSPORT CONTAINERS

The invention relates to a machine for producing parallelepiped packages, particularly for milk, juice or the like, which each comprise a tube of synthetic plastics coated carrier material such as, for example, paper or cardboard, with means for forming the tube and means for injection moulding synthetic plastics material onto the tube with, extending along the machining path, a conveyor belt supporting a series of cross-sectionally rectangular transport containers, with means for introducing the tube into the relevant transport container and with means for taking out and carrying away the machined tube.

The manufactures of packages for flowable media are familiar with such machines. For example, parallelepiped milk packages are produced, where the tube consists of coated paper and is formed by closure along a longitudinal sealing seam, the bottom being formed by folding over a part of the tube material which is then sealed in a fluid-tight manner. The top of known milk packages consists either completely of synthetic plastics material or has synthetic plastics bridges which are injection moulded between paper tabs and which are also connected to opening devices so that when the synthetic plastics material is moulded onto the top end of the tube, the opening device can be moulded on at the same time.

For the production of such packages which are to hold flowable media, powerful machines are desirable, i.e. it is hoped, with reliable sealing and perfectly constructed opening devices, to produce a package in large quantities per unit of time which can then be filled and carried away.

It will be understood that the moulding operation, even if the entire top with the opening device is being moulded onto the tube, calls for a minimum of time because the tube of the package has to be fitted onto a mandrel which serves as the interior mould and it is necessary then for outer mould parts which can be moved away from and then towards each other to be placed around one end of this mandrel, closed and tensioned, whereupon the synthetic plastics composition is injected in a flowable state at high temperature, whereupon the mould parts must as far as possible be cooled and then opened again. The movements of the mould parts take place rhythmically, and it is possible by shortening the cadence to increase the output from the machine. However, shortening the cadence must depend upon a number of factors, including the distances the injection moulding parts have to travel.

The object of the present invention is to increase the output from a package producing machine of the type mentioned at the outset, preferably in such a way that the injection moulding tools can be opened and closed more rapidly.

According to the invention, this problem is resolved in that at least a first part of at least one strand of the endlessly moving conveyor belt extends at a fixed angle of preferably about 45° to the second part of this strand and in that a side wall of a transport container is disposed parallel with the main plane of the flat conveyor belt and in that rails are fixed to guide the conveyor belt along its conveyance path. As a result of the foregoing measures, the rate of delivery from a package producing machine can unexpectedly be improved in that the movement paths of the injection mould parts are shortened.

This knowledge is based on the following considerations. Where the manufacture of packages for liquids is concerned, it has been found suitable to use conveyor belts for guiding a paper tube in a transport container from one machining station to the next, i.e. during the course of production, to provide the tube with integrally moulded top parts, to place the package upside down, to fill it, to fold over the bottom end and close it by a sealing process. It is vital particularly in the case of cross-sectionally quadrangular tube-shaped packages, for the row of tubes and thus the row of transport containers to be so disposed on the conveyor belt that the main plane of the conveyor belt is parallel with at least one side wall of the tube. It was this disposition of the relevant tube which was adopted as the premise in the injection moulding equipment, which is why outer mould halves were, over at least half the tube width, moved out of the injection moulding position in order to clear the way for the package provided with the integrally moulded top to pass on to the next station. In other words, it will be appreciated that the tube with the integrally moulded top can only be moved out of the injection mould when the way is clear or when the tools have been moved completely out of the path. If one observes a cross-sectionally quadratic package from above and in the longitudinal direction of the said package, it will be understood that each outer mould half of the injection moulding apparatus had to be moved out by at least half the edge width of the tube before the tube could be moved further out of the opened injection moulds.

It is on this premise that the invention is based and it proposes a position of the tube in the injection moulding equipment where the travel of the outer mould halves of the injection moulding equipment is shorter. This is the case for example when, in the plan view of the cross-sectionally quadratic package or tube, the direction of movement is not parallel with two or at right-angles to both the other oppositely disposed side walls, the tube being instead so rotated through 90° that the direction of movement of the tube is parallel with a diagonal (and consequently at right-angles to the other diagonal). It has been found that in fact even after a minimal opening of the outer mould halves the movement to eject the tube with the integrally moulded top can start, so that the clock time can be shortened and therefore the machine output increased.

This knowledge and inventive idea were, however, countered by the condition that for the aforedescribed machining operations, the relevant transport container with the tube had to be parallel with the conveyor belt. If both conditions are combined, then it is possible to understand the teaching according to the invention, which is namely that a part of a strand of the conveyor belt should be disposed at a specific angle to the other part because this makes it possible on the one hand to guide the package through the individual machining stations in the correct position while on the other it is possible to guide it "cornerwise" through the synthetic plastics moulding unit.

It is expedient thereby for the unit for integrally moulding synthetic plastics onto the tube to comprise a mandrel wheel driven to rotate intermittently about an axis and having four radially projecting parallelepiped mandrels to serve as inner moulds as well as two outer mould halves adapted for movement in the direction of the mandrel wheel axis, the angled-over first part of the strand of the conveyor belt which is guided with deflector wheels being rectilinear in the region of the mandrel wheels, the spindles of the deflector rollers alongside the mandrel wheel being substantially perpendicular to the mandrel wheel axis, the direction of movement of this rectilinear strand being at about 45° to the mandrel wheel axis. The relevant inner mandrel is therefore moved out of the outer mould parts by the rotary movement of the mandrel wheel and this rotary movement can start after the mandrel wheel and this rotary movement can start after the outer mould parts, and preferably two outer mould parts are involved, have first been moved a distance away from each other. While the mandrel wheel is starting to move out the tube with the integrally moulded top, the outer mould halves start at the same time to move on into their final position, until the entire width of the travel for the tube is clear. Conversely, when a new tube has been introduced, which has no top, the insertion movement can still take place while the outer mould halves have already started their closing operation. This simultaneous nature of the movement permits of a substantial shortening of the clock times and thus an increase in machine output.

Looking down on the preferably endlessly revolving conveyor belt, in the direction of the conveyor belt deflector wheels, then the axis of the mandrel wheel should be imagined as being at right-angles thereto. If the path of movement of the conveyor belt is horizontal, i.e. if the axes of the deflector wheels for the conveyor belt are vertical, then the mandrel wheel axis is in the horizontal plane. Subject to this disposition of the parts, the rectilinear part of the conveyor belt which is angled-over in the manner described, is preferably so guided into the region of the mandrel wheel that its axis encloses an angle of 45° with the direction of movement of the said rectilinear strand of the conveyor belt. In this way, it is possible in the region of the moulding unit to achieve a rotation of the tube through 90° in the manner described hereinabove so that the tube is actually positioned "cornerwise" in the mould parts while flat side wall (of the four flat side walls) of the tube and thus of the transport container remains parallel with the main plane of the flat conveyor belt.

With regard to the attachment of the transport container on the conveyor belt, the invention provides for the conveyor belt to be a toothed belt on which are mounted retaining members for carrying the transport containers and the height of which is substantially the same as the width of the conveyor belt, the retaining members having runners by which they are guided along the path of conveyance and in the guide rails. For deflection of a conventionally U-shaped conveyor belt, it is in fact not simple to reverse the direction of a first part of the strand compared with the rest of the conveyor belt. Viewed from above in a vertical direction, when the path of movement of the conveyor belt is substantially horizontal, the result in fact is to have convex and concave parts of the conveyor belt. The term convex is used here to describe the outwardly bulging while the term concave describes the inwardly curved parts of the conveyor belt. In the case of a convexly curved conveyor path, it is simple for this to be deflected by disposing on the inside a deflector wheel because this latter does not interfere with the movement, especially since the transport containers are disposed on the outside of the conveyor belt. The situation is however quite different in the concave part of the path of movement, because for such a deflection it is necessary to dispose a deflector wheel on the outside, but this is impossible because in this case the conveyor belt is carrying the transport containers. Therefore, the invention has provided guide rails by means of which runners on the retaining members and thus the retaining members themselves are guided so that via the retaining members the conveyor belt can be deflected into any desired path. The need for deflector wheels to be disposed on the outside in the concave part of the belt movement is thus advantageously eliminated.

According to the invention, it is furthermore expedient that fitting of the plate-like retaining member on the conveyor belt is achieved by means of at least one clamping block which is so mounted on the retaining member that engagement around the conveyor belt is U-shaped and in that on the side opposite the conveyor belt, in respect of the retaining member, there is an intermediate tooth which projects from the clamping block to engage a gap between the teeth of the conveyor belt. The teeth of the conveyor belt serve on the hand to drive it and on the other to fix the retaining members on the conveyor belt. The plate-like form of the retaining member has the advantage that fitting the plane side wall of the transport container is easier and furthermore, by virtue of its plate shape, the retaining member also has a certain length in the direction of conveyance, resulting in guidance advantages. It is in fact expedient to dispose at least at one end of the plate or of the retaining member two spaced-apart runners as this accurately establishes the position of the plane of the retaining member and thus the position of the transport container, in that the runner is engaged in the rail.

It is particularly advantageous if, according to the invention, both along the upper and also along the lower longitudinal edge of the conveyor belt there is in each case a guide rail which is rigidly mounted via stands and which serves to accommodate and guide rollers and/or sliding blocks disposed on the retaining members. In fact, it has been found convenient either to fit rollers on the runners or sliding blocks which run in the rigid guide rails, so providing a guide arrangement which has a long effective life and which is subject to only minimal wear and tear.

In an advantageous further developement of the invention, the main plane of the plate-shaped retaining member is parallel with the main plane of the conveyor belt, the retaining member is in the form of a substantially trapezoidal plate and one runner is disposed on the upper narrower and two serially disposed runners are disposed on the lower wide end of the trapezoidal retaining member, a clamping block being disposed preferably at each of the two ends of the retaining member. By virtue of the serially disposed runners, the path followed by the guide rail determines precisely the position of the retaining member and thus of the transport container so that the tube contained therein is correctly guided into the individual treatment stations of the machine.

If, as in a further development of the invention, two strands of the conveyor belt are disposed parallel with each other, and are angled-over so that they pass through the region of two mandrel wheels and if both mandrel wheels have a common axis of rotation, then the output from the machine can be doubled. This use of two mandrel wheels with a common axis of rotation has, in fact, already been taken into account with conventional conveyance paths but in the case of an angled-over straight part of one strand of the conveyor belt, the operation of two mandrel wheels at the same time did not seem to be readily possible. Nevertheless, this advantage can also be combined with the present invention and its teaching if the conditions described are respected.

With regard to the transport containers themselves, it has been found to be particularly expedient for each transport container to be constructed in the form of an elongated tube open at both ends and consisting of four substantially flat side walls which at their top ends are bent over outwardly at an angle so that they jointly form a funnel. Such transport containers are rugged, easily manufactured and very practical in operation.

For the transport containers it is furthermore a good idea for their side walls to be provided in the region of their top end with cut-outs to remove the corners. This facilitates production, because with the corners removed it is easier to bend over the edges of the side walls and thus the funnel-shape can be more easily established. And also by virtue of this, the individual tubes can be more easily introduced into the transport containers during operation.

The conveyor belt according to the invention passes endlessly over driving and deflector wheels, preferably only one single driving wheel being provided and having teeth to engage the tooth gaps in the conveyor belt which is constructed as a toothed belt; the other deflecting wheels of the conveyor belt, on the other hand, have smooth surfaces.

By virtue of the teaching of the above-described invention, the conveyor belt is then no longer passed simply in a double-U-shape but even with such an endlessly rotating conveyor belt, a curvature can be established in the manner described so that a straight partial strand is at the correct angle to the synthetic plastics moulding arrangement, the conveyor belt moving the individual tubes within the treatment stations in the correct position. Thus, the mould halves can be rapidly opened and closed and passage of the parts of the package which are being processed can be accelerated. The correct disposition of the tube of the passage cornerwise in the injection moulding unit, i.e. so that one edge of the tube is in front in the direction of movement while the other diagonally opposite edge is at the back in the direction of movement, means that already upon the initial opening of the outer mould halves, the gear mechanism can start to move the inner mandrel. Already following the initial opening of the outer mould parts, therefore, movement of the inner mould part, i.e. of the mandrel in the tube, can be simultaneously started and occur in parallel.

Prior to this solution according to the invention being found, thought was also given to pivoting the transport containers during the course of their conveyance movement. However, this pivoting and rotation not only resulted in high production costs but also the test structure proved to be susceptible to wear and to be unstable. The new fixing of the transport containers on the conveyor belt and the guidance of the conveyor belt in rails provides not only the advantage that the tubes to be machined are brought into and removed from each station in the correct position but the package tubes are also firmly supported so that each machining arrangement can engage the tubes in the correct position.

BRIEF DESCRIPTION OF THE DRAWINGS

Further advantages, features and possible applications of the present invention will emerge from the ensuing description of preferred examples of embodiment, in conjuction with the attached drawings, in which.

Figure 1:
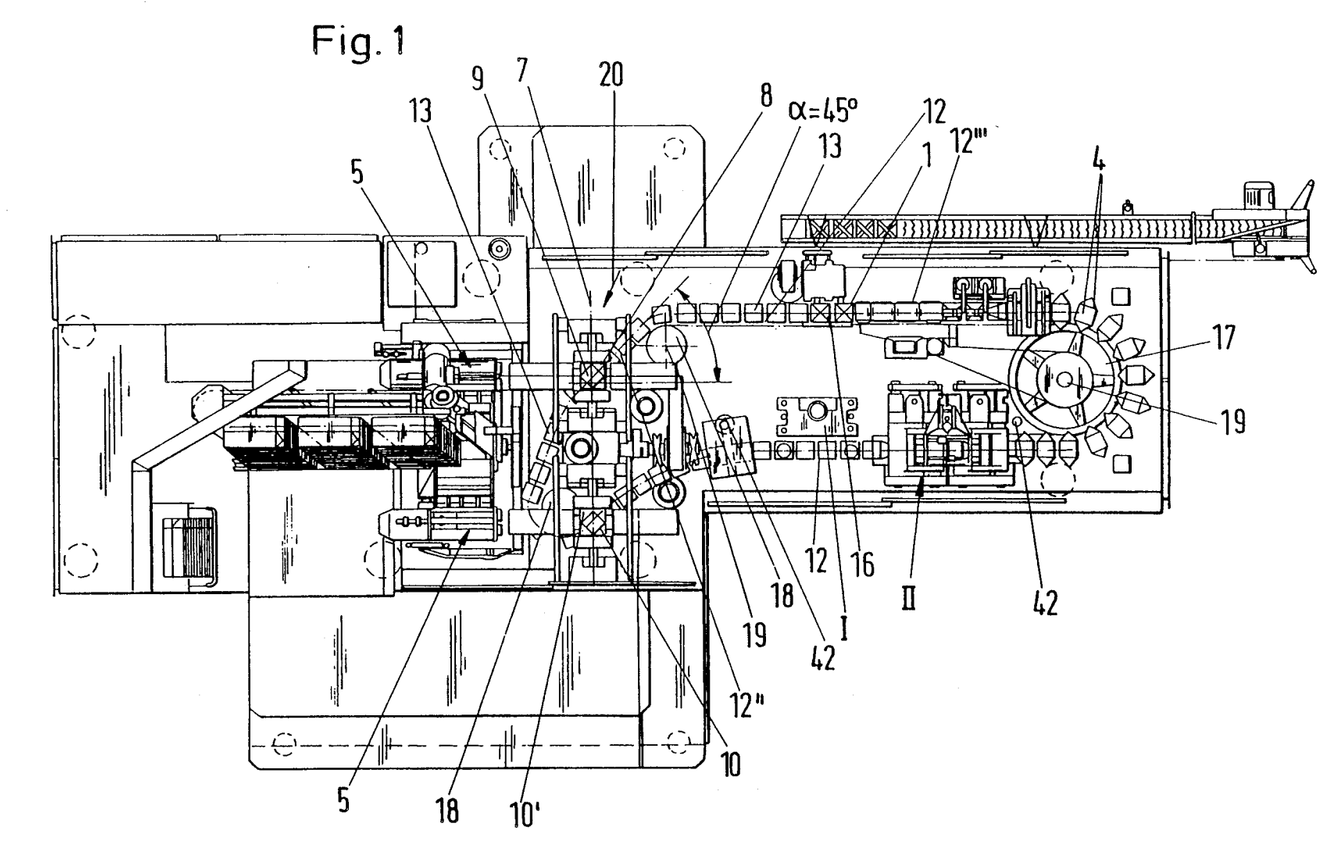
FIG. 1 is a plan view of the package producing machine mainly showing the conveyor belt in its position in respect of two mandrel wheels.
Figure 2:
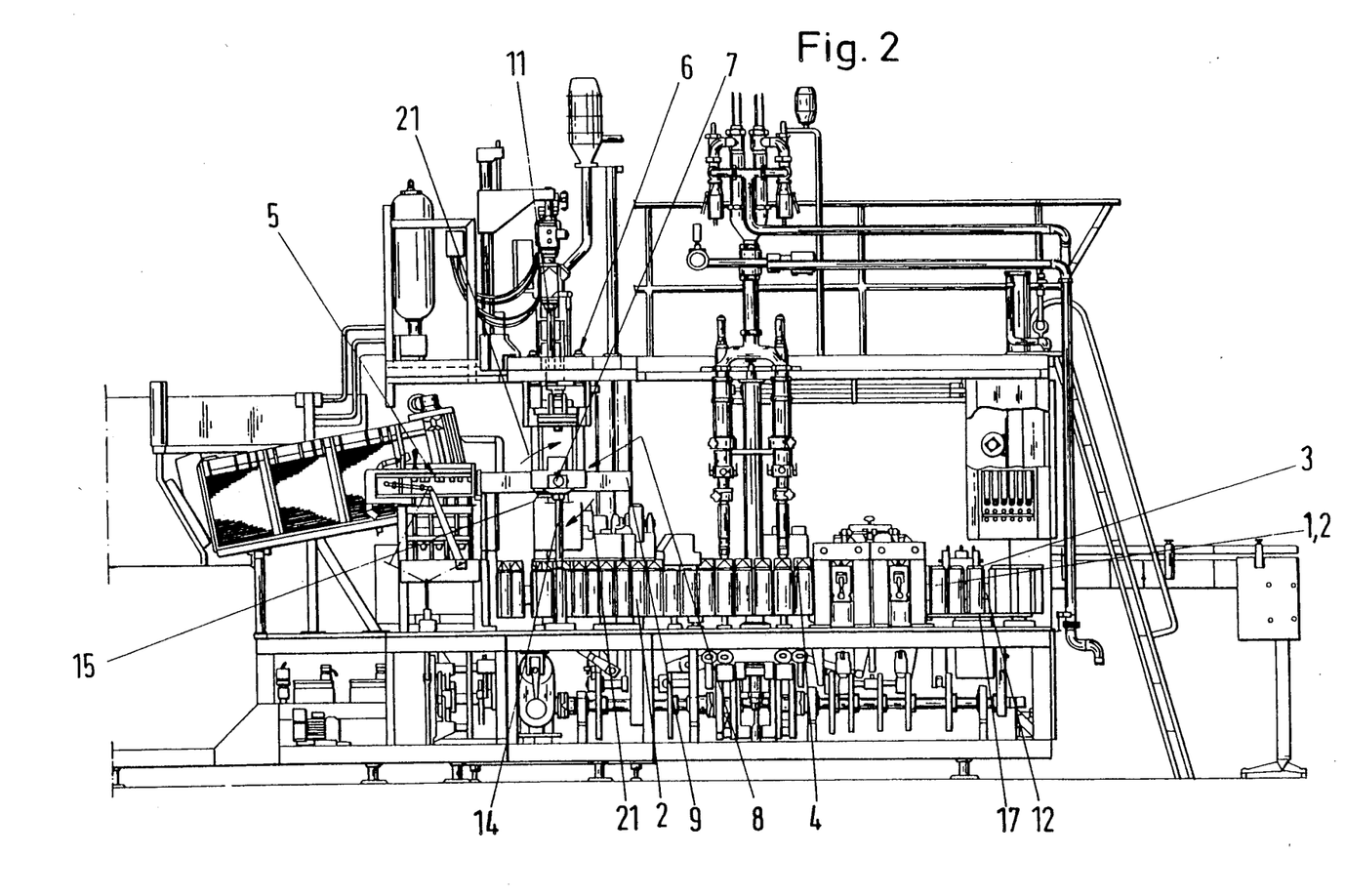
FIG. 2 is a side view of the machine in FIG. 1 looking, for instance, from the bottom upwardly in FIG. 1.

The overall view of the package producing machine is best seen in FIGS. 1 and 2 in which, however, only those parts which are of interest to the invention are clearly shown.

Assuming that it is necessary to produce a package 1 having a tube 2 of coated paper, an integrally moulded top 3 of synthetic plastics material and a bottom consisting of folded parts 4. To produce such a package, means generally designated 5 are shown and are used for forming the tube 2, while FIG. 2 shows means 6 of integrally moulding synthetic plastics material onto the tube 2. In this case, there are two (see also FIG. 1; only one mandrel wheel is described, because both wheels are identical) mandrel wheels 8 having four radially projecting cross-sectionally quadratic mandrels 9 which act as inner moulds and two outer mould halves 10, 10' adapted for movement in the direction of the mandrel wheel axis 7, and one injection moulding unit 11. This latter is a normal synthetic plastics moulding unit.

Extending along the entire machining path is a conveyor belt 12 which takes the form of a toothed belt supporting a row of serially disposed cross-sectionally quadrangular transport containers 13. In the top left-hand part of FIG. 1, upstream of the first curvature, these containers are empty while in the lower concave portion there are tubes in the individual transport containers. FIG. 2 shows an arrangement for introducing the relevant tube 2 into the transport container 13 in the form of a guide rod 14 with an angled member 15. The completely finished tubes 2 are removed by the means 16 which are not described in greater detail but which are shown in the top centre of FIG. 1.

Figure 3:
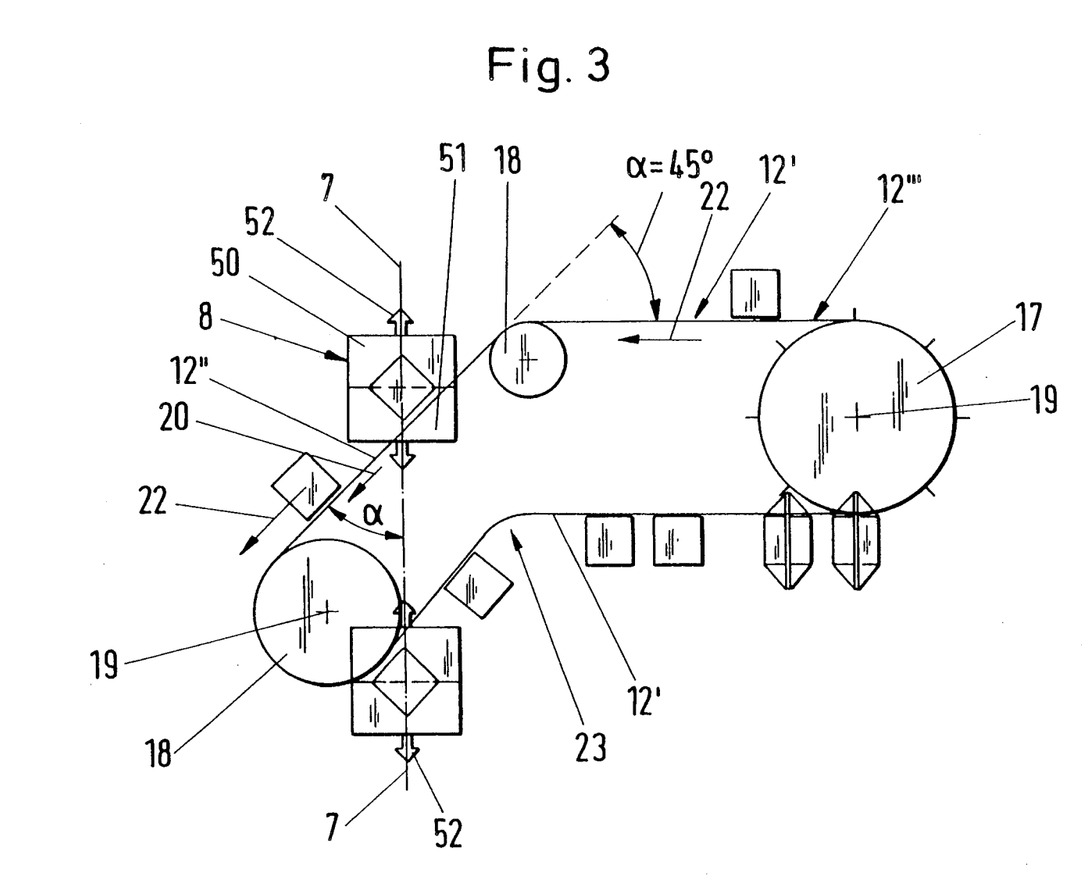
FIG. 3 diagrammatically shows the fitted conveyor belt with the two injection molding stations in the form of an inner mould part and two outer mould halves.

Important to the invention is the path followed by the conveyor belt 12 which can be seen particularly well in FIGS. 1 and 3. The mandrel wheel 8 shown at the top in these drawings is the rear mandrel wheel while that shown at the bottom is referred to here as the front wheel. In FIG. 2, in fact, one is looking at the front mandrel wheel 8.

The conveyor belt 12 comprises a driving wheel 17 and a plurality of deflector wheels 18 of which only two are shown and which have in each case vertical axes 19. The conveyor belt 12 has an upper and correspondingly a lower strand both of which are designated 12' and which extend from the driving wheel 17 to the left-hand deflector wheel 19. The upper strand 12' comprises a first part 12'' following the convex deflection about the upper deflector wheel 18. This first part 12'' of the strand 12' is rectilinear in the region of the mandrel wheel 8, as can be seen both from FIG. 1 and also from FIG. 2. (By duplicating the plant with the two mandrel wheels 8, the same situation results also for the lower front mandrel wheel 8. However, the explanation is sufficient in conjunction with one, in this case for example the upper rear mandrel wheel 8.) This rectilinear first part 12'' of the strand 12' is disposed at an angle of 45° to the second part 12''', this second part 12''' being the main part of the upper strand 12' and being disposed in FIGS. 1 and 3 in the top right-hand part between the driving wheel 17 and the first deflector wheel 18. The angle $\alpha = 45°$ can also be established there where the axis 7 of the mandrel wheel 8 encloses the angle $\alpha$ with the direction of movement 20 of this rectilinear strand 12'' (FIG. 3).

For general understanding of the package producing machine, there follows explanation of where the individual machining stations are disposed. The tube of coated paper is prepared by the means 5 and pushed onto the mandrel 9 on the mandrel wheel 8 which happens to be horizontal and over to the left. Afterwards, the mandrel wheel 8 is rotated in the direction of the arrow 21 in FIG. 2. The top is moulded on in the synthetic plastics moulding unit 6, after which the mandrel wheel 8 moves on rightwards in the direction of the arrow 21 and finally downwards to a position above the transport container 13 which is empty and positioned under the relevant mandrel wheel 8. When two mandrel wheels 8 with a common axis 7 are used, the mandrel 9 of the lower mandrel wheel 8 pushes into a gap in the conveyor belt, between two transport containers 13 which are already filled with tubes 2. According to FIGS. 1 and 3, the conveyor belt 12 moves in an anticlockwise direction 22, which includes the direction of movement 20 of the rectilinear strand 12''.

After leaving the front lower mandrel wheel 8, the tube 2 with the integrally moulded top 3 now passes through the concave part 23 of the lower strand 12' of the conveyor belt 12, being filled in position I, the bottom being closed in the station II and the finished tube being removed from the conveyor belt 12 in the unit 16 and transported away.

So that also the concave part 23 of the strand 12' of the conveyor belt 12 follows the desired path exactly, the conveyor belt is guided via retaining members 30 and, accordingly, also the transport containers 13 are guided as will now be described.

Figure 6:
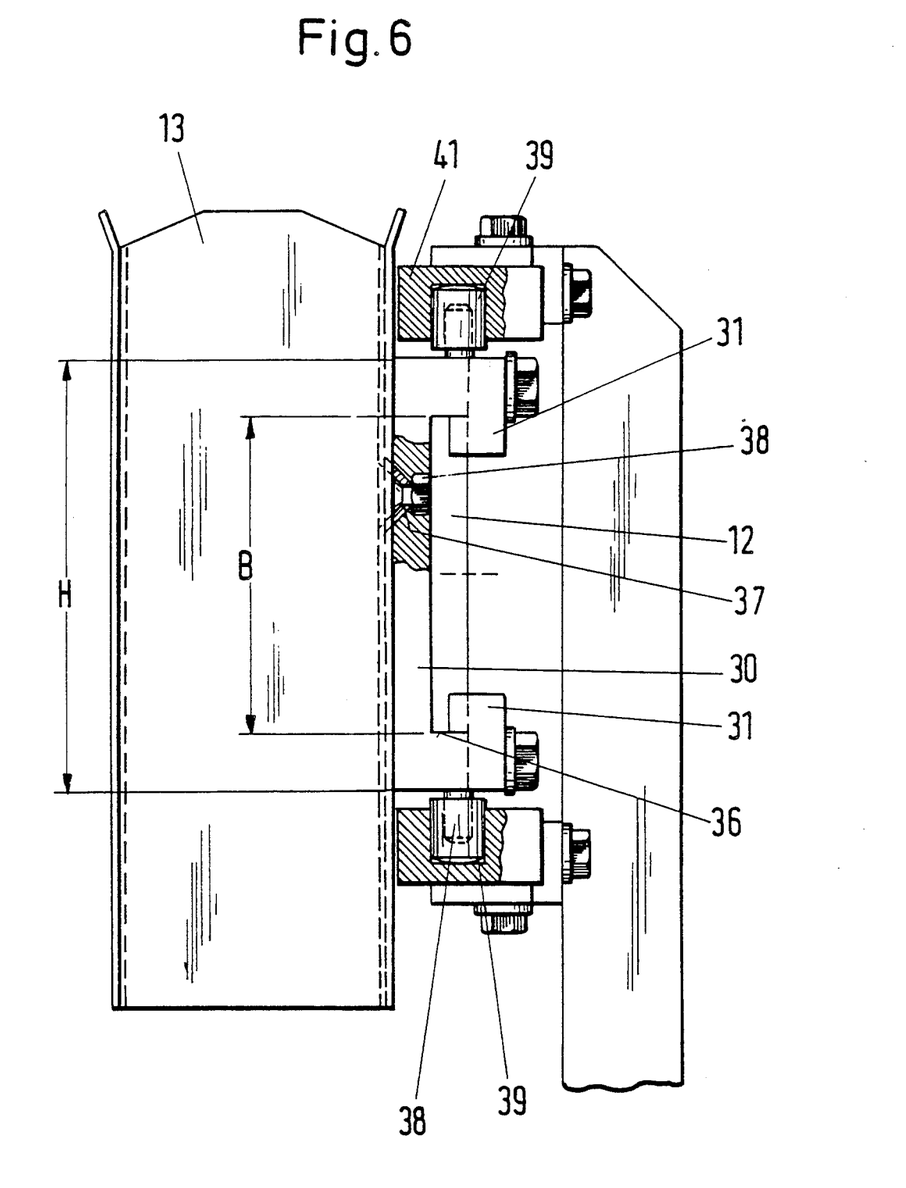
FIG. 6 is a lateral and partially sectional view of a stand with guide rails and, guided in these latter, retaining members with transport containers fitted.
Figures 7, 8, 9:
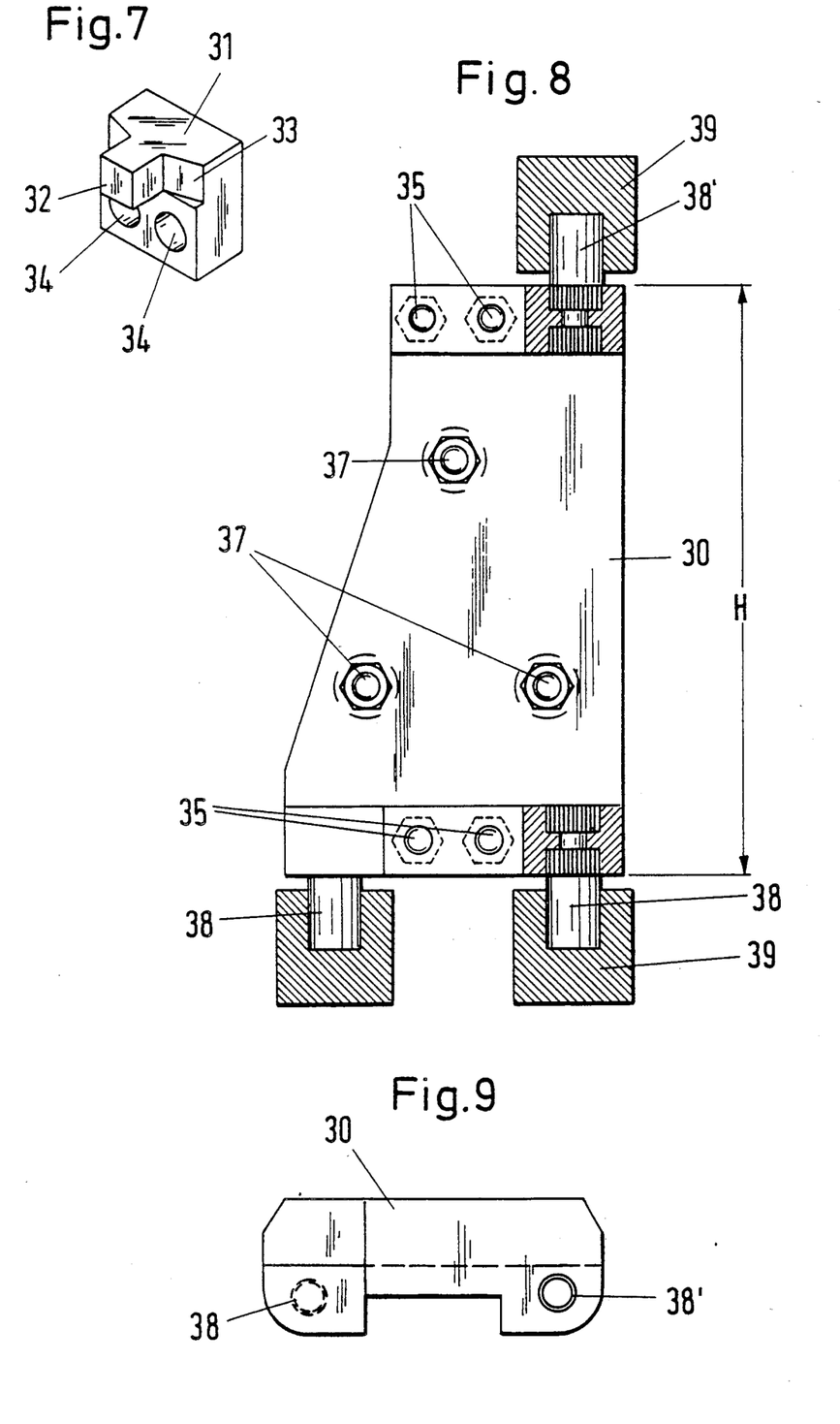
FIG. 7 is a perspective view of a clamping block.
FIG. 8 is a side view of a retaining member.
FIG. 9 is a plan view of FIG. 8.
Figure 10:
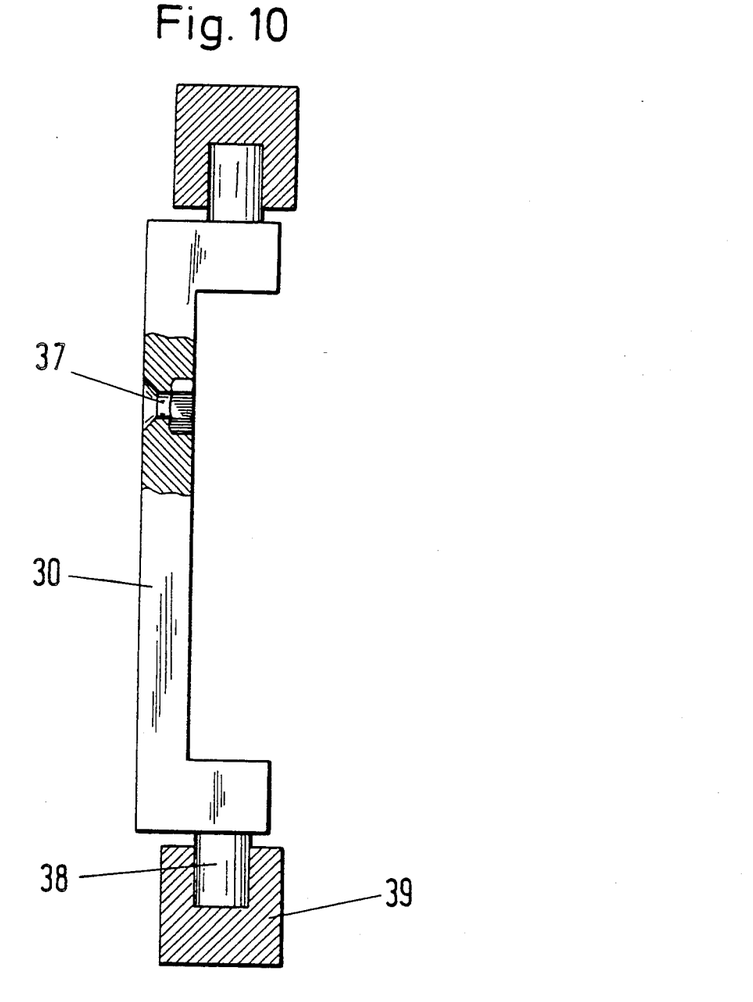
FIG. 10 is a side view of the retaining member looking from right to left in FIG. 8.
Figure 11:
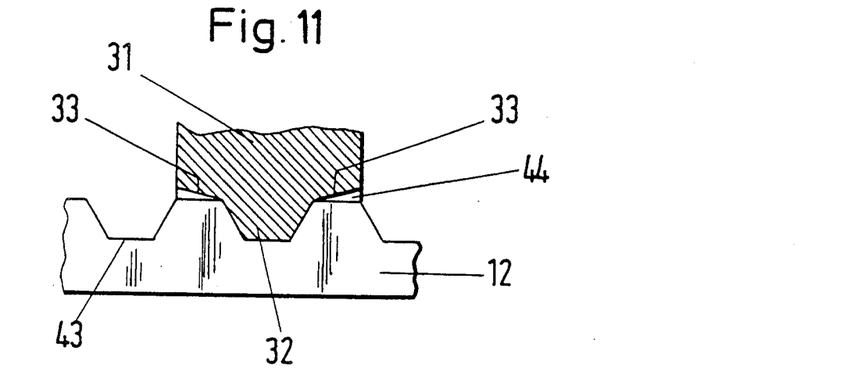
FIG. 11 is a broken-away view of the position of engagement of a clamping block in the conveyor belt which is in the form of a toothed belt.

The conveyor belt 12 is a toothed belt as FIG. 11 shows. A vertical section is shown in FIG. 6. FIGS. 8 to 10 show the retaining member 30. It takes the form of a trapezoidal plate and preferably consists of synthetic plastics material although it can also consist of aluminium. The height H of the retaining member 30 is substantially equal to the width B of the conveyor belt 12 or it projects beyond this latter in such a way that the upper and lower narrow edge of the conveyor belt 12 has engaging around it in an L-shape the short arm of the retaining member 30. The actual fixing is carried out by clamping blocks 31 of which one is shown in perspective in FIG. 7. It is parallelepiped in form and has on one side, in the upper part, an intermediate tooth 32 flanked by two small chamfered surfaces 33 which provide for the curvature of the toothed belt when the retaining member 30 is rigidly fixed. In the lower part, the clamping block 31 has two fixing holes 34 by which it can be fixed to the retaining member 30 by means of screws which are passed through corresponding holes 35 in the retaining member 30 (see FIG. 8). Therefore, when the clamping block 31 is screwed into position, the upper and also the lower longitudinal edges 36 of the conveyor belt 12 are enclosed by a U-shape, as can be clearly seen from FIG. 6. It is possible to pass through holes 37 in the retaining member 30 screws 38 which extend to the transport container 13 (FIGS. 6 and 12), so that the transport container 13 is fixed to the retaining member 30 at three points. The clamping block 31 (FIG. 7) is however also bolted to the upper narrower end of the trapezoidal retaining member 30 through the holes 35 which are also shown there.

Figure 13:
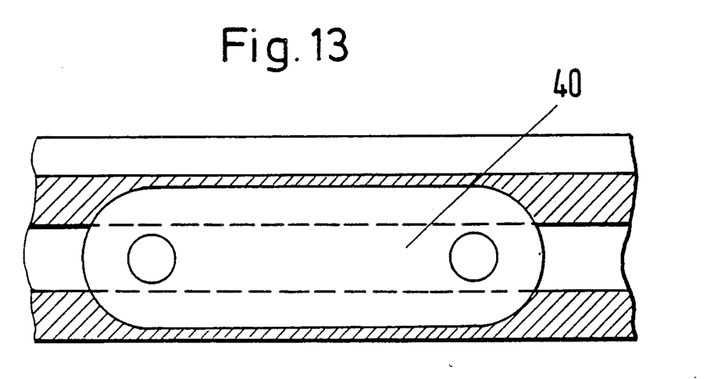
FIG. 13 shows the configuration of a sliding block as an alternative to the rollers at the bottom end of the retaining member.

Projecting from the upper narrower end of the retaining member 30 is a runner 38' while from the lower broader end of the trapezoidal retaining member 30 there project two runners 80 which are, in the view shown in FIG. 8, provided with rollers 39. However, both runners 38 may be provided with a sliding block 40 at the bottom, as shown in FIG. 13, the result being the same.

The rollers 39 or sliding blocks 40 do in fact run in guide rails 41 (FIG. 6) which are rigidly mounted on stands 42. The entire stand 42 can be seen in side elevation in FIG. 6 while FIG. 1 shows, for example, just two stands 42 on the inside of the lower strand 12'. It will however be appreciated that for a correspondingly rugged supporting of the guide rails 41, a plurality of such stands 42 are disposed along the conveyance path.

FIG. 11 shows the engagement of the intermediate tooth 32 of the clamping block 31 into a gap 43 between two teeth of the conveyor belt 12 which is constructed like a toothed belt. Between the outer end surfaces of the teeth of the conveyor belt on the one hand and the oblique flanks 33 of the clamping block 31 on the other there are, when the conveyor belt 12 is running straight as illustrated in FIG. 11, air spaces in the form of a wedge 44 from which the man skilled in the art will understand that with the curvature of the conveyor belt 12 there will be sufficient space towards the clamping member 31 to guarantee adequate space for movement of the toothed belt.

Figure 4:
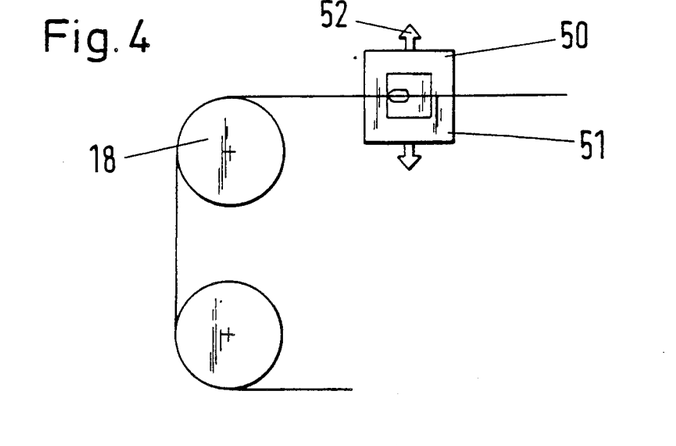
FIG. 4 diagrammatically shows the conventional arrangement of double-U-wisely guided conveyor belts and movement of the tube with parallel side walls.
Figure 5A:
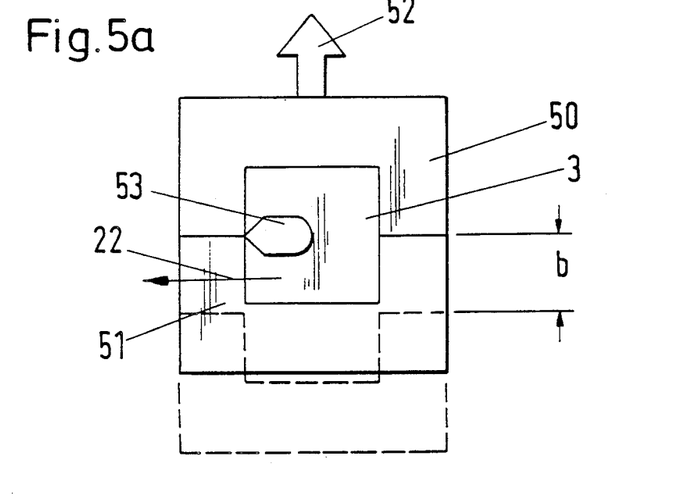
FIG. 5a shows diagrammatically and in an enlarged view the side walls of the tube, here shown as parallel, the side walls also being parallel with the direction of movement.

If the outer mould halves 50, 51 according to FIGS. 4 and 5a were to be opened in the direction of the double-headed arrow 52, then the tube provided with the opening device 53 and the top 3 could only be moved out of the mould in the direction of the arrow 22 when the relevant (and in the case assumed here this will, for example, be the lower) mould half 51 is moved out of the position shown by solid lines and downwardly through the distance b into the position shown by broken lines. Only then is the way completely clear.

Figure 5B:
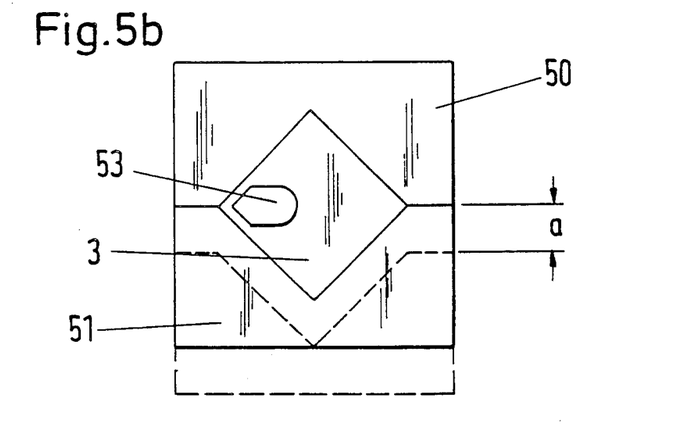
FIG. 5b shows the tube disposed cornerwise in the moulding unit.

By the above-described particular positioning of the tube 2 or of the transport container 13 in relation to the mandrel wheel 8, as also shown diagrammatically in FIG. 3, the cornerwise disposition according to FIG. 5b can be achieved. If, now, the lower outer mould half is in turn moved just through a substantially smaller distance a out of the position shown by solid lines in FIG. 5b downwardly into the position shown by broken lines, then (both outer mould halves move simultaneously) shorter after commencement of the movement of the outer mould halves, the movement of the tube with the top 3 can commence. In this case, the amount of travel a is substantially less than the path b.

Figure 12:
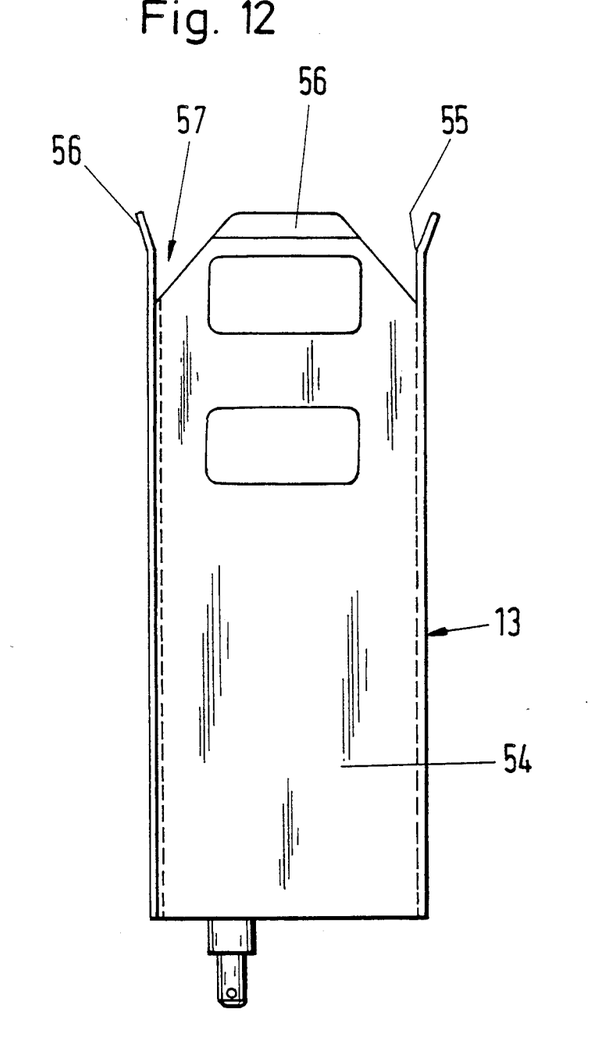
FIG. 12 shows a receiving container.

Finally, FIG. 12 shows the transport container 13 in the form of an elongated tube which is open at both ends. It has four substantially flat side walls 54 which are bent over outwardly at an angle (at 55) at their top end so that they gently form a funnel. Between two bent-over edges 56 there are cut-outs 57 by which corners are removed, which accordingly facilitates manufacture.

We claim:

1. An apparatus for producing parallelepiped containers, which comprises means for forming tubular container bodies, means for injection molding a resinous material onto said tubular container bodies, a plurality of cross-sectionally rectangular transport containers for said tubular bodies, said transport containers having a side wall, conveyor means for supporting and moving said transport containers along a machining path and comprising at least one strand having first and second parts, said first part extending at a fixed angle of about 45° C. to said second part, means for introducing said tubular container bodies into said transport containers and means for removing said container bodies therefrom, fixed rail means for guiding said conveyor means along a conveyance path, said side wall of said transport containers being disposed parallel with said conveyor means, and molds with a separation plane at an acute angle to said conveyor means.

2. The apparatus of claim 1 wherein the injection molding means comprises mandrel wheel means for intermittent rotational movement about an axis, said mandrel wheel means having a plurality of radially projecting parallelepiped-shaped mandrels with said molds movable in the direction of said mandrel wheel axis, deflector wheel means with spindles, the first part of said strand of said conveyor means being angled over and guided by said deflector wheel means and is rectilinear in the region of said mandrel wheel means, the spindles of said deflector wheel means being disposed alongside said mandrel wheel means, the direction of movement of said first part of said strand of said conveyor means being at about 45° to said axis of said mandrel wheel means.

3. The apparatus of claim 2 wherein said conveyor means comprises toothed belt means having a height and width substantially equal, said belt means having retaining means with runners guided in said fixed rail means to move lengthwise of said conveyance path.

4. The apparatus of claim 3 wherein fitting of said retaining means is achieved by means of at least one clamping member mounted on said retaining means for engaging around said toothed belt means, said clamping means being substantially U-shaped, the side opposite said toothed belt means with respect to the retaining means including an intermediate tooth projecting from said clamping member to engage a gap between the teeth of said toothed belt means.

5. The apparatus of claim 4 including stands for rigidly mounting said fixed rails, roller means mounted on said retaining means for guiding movement of said conveyor belt means and transport containers.

6. The apparatus of claim 5 including stands for rigidly mounting said fixed rails, sliding block means on said retaining means for guiding movement of said conveyor means and transport containers.

7. The apparatus of claim 3 wherein said retaining means comprises a plate-like member disposed parallel with the plane of said conveyor means, said retaining means taking the form of a trapezoidal plate with a runner in an upper narrower end of said retaining means and a plurality of runners disposed at a lower wider end of said retaining means, said apparatus including a clamping member at the upper and lower ends of said retaining means.

8. The apparatus of claim 2 wherein multiple strands of the conveyor means are disposed so they are angled over one another, said apparatus including multiple mandrel wheels having a common axis of rotation.

9. The apparatus of claim 8 wherein said transport containers are elongated tubular structures open at both ends with substantially planar side walls which at their respective upper ends are flared outwardly in a funnel-like configuration.

10. The apparatus of claim 9 wherein said transport container side walls have corners removed in their upper ends to form recesses.

11. The apparatus of claim 10 wherein said deflector wheel means have smooth surfaces.

* * * * *